G. E. MORRIS & O. F. OLIVER.
PNEUMATIC PORTABLE RECIPROCATING SAWING MACHINE.
APPLICATION FILED MAR. 25, 1914.
1,119,524.
Patented Dec. 1, 1914.
2 SHEETS—SHEET 1.
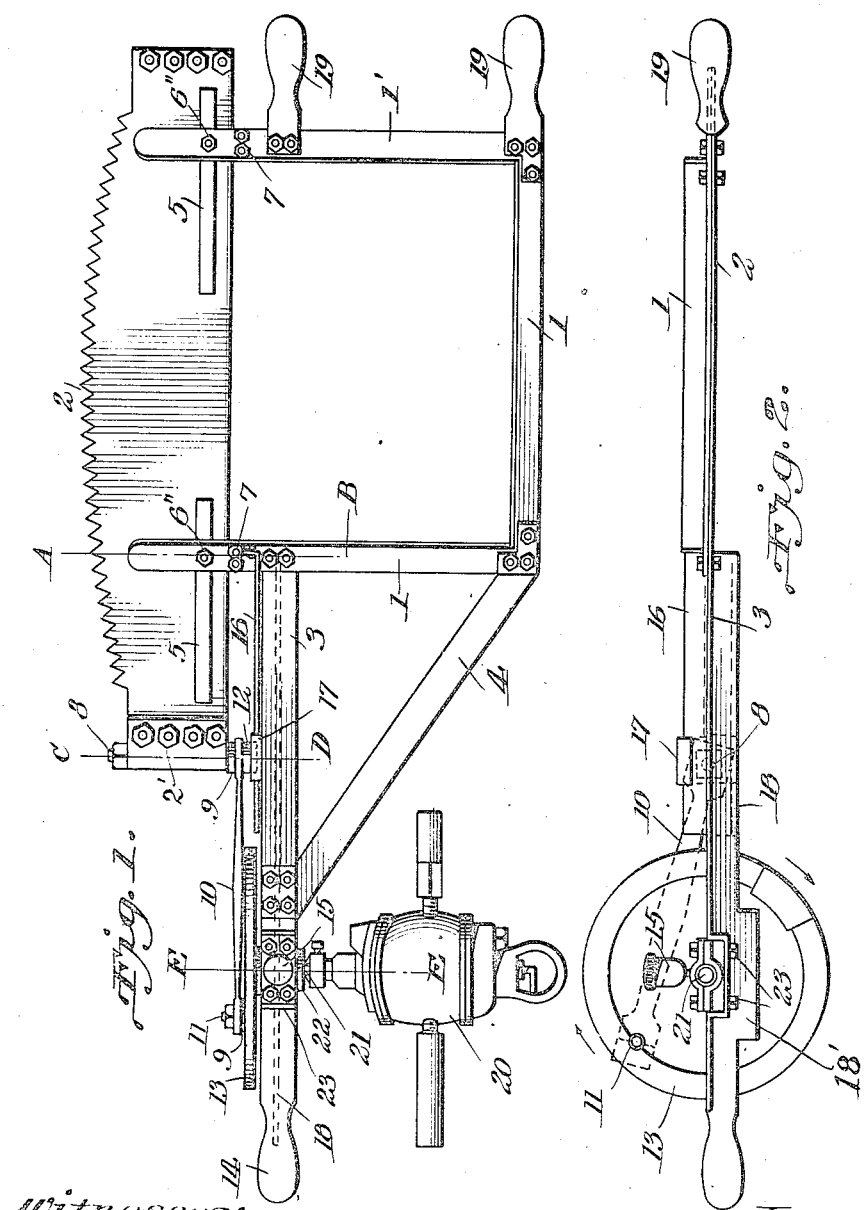

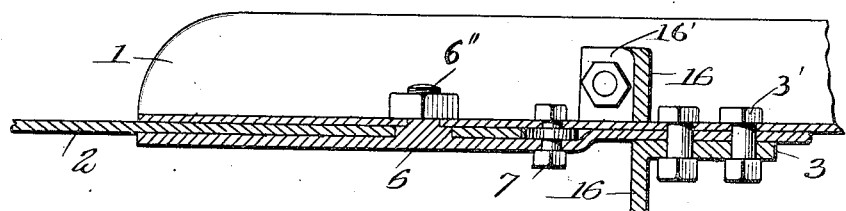
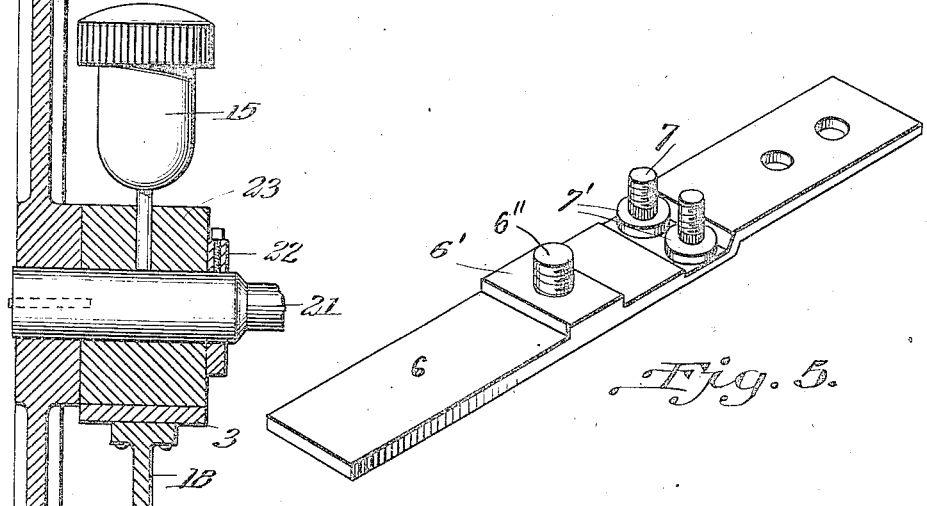
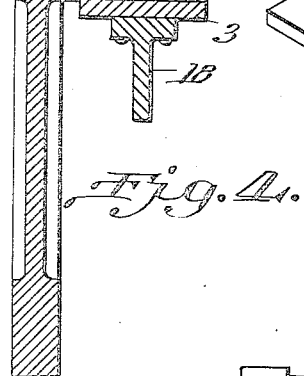
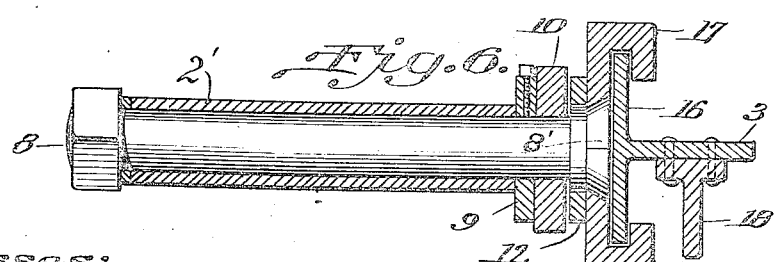

UNITED STATES PATENT OFFICE.

GEORGE E. MORRIS AND OSCAR F. OLIVER, OF JERSEY CITY, NEW JERSEY.

PNEUMATIC PORTABLE RECIPROCATING SAWING-MACHINE.

1,119,524.  Specification of Letters Patent.  Patented Dec. 1, 1914.

Application filed March 25, 1914. Serial No. 827,119.

*To all whom it may concern:*

Be it known that we, GEORGE E. MORRIS and OSCAR F. OLIVER, citizens of the United States, and residents of Jersey City, in the county of Hudson and State of New Jersey, have invented a certain new and useful Pneumatic Portable Reciprocating Sawing-Machine, of which the following is a specification.

This invention relates to wood sawing, and more especially to motor-driven drag saws wherein the blade has a reciprocating action; and the object of the same is to produce a saw of this kind driven preferably by a pneumatic motor and which can be carried about by two men and held in place to saw horizontally as when felling trees or vertically as when cutting logs, or in any other position.

The invention consists in details of construction set forth in the following specification and shown in the drawings wherein—

Figure 1 is a plan view of this complete machine, showing the blade set horizontal and prepared to saw through a standing tree, and Fig. 2 is a front elevation of the saw as seen in Fig. 1, but with the motor omitted. Fig. 3 is an enlarged section on the line A—B of Fig. 1, Fig. 4 a section on the line E—E of the same view, Fig. 5 a perspective detail of the lip, and Fig. 6 a section on the line C—D of Fig. 1.

The frame of this machine comprises a yoke, a shank, and a suitable brace. The yoke 1 is of L-iron bent into substantially U-shape as best seen in Fig. 1, and it comprises a straight back parallel with the saw blade 2, and two legs the outermost of which carries a pair of handles 19. The shank is made up of a bar 3 of T-iron and a second bar 18 of T-iron underlying and secured to the web of the first bar. The latter is bolted at its inner end to the inner leg, its head 16 extends for a distance therefrom and forms a guide for the cross head 17, and its outer end carries a handle 14. The T-bar 18 as best seen in Fig. 6 underlies the web of the T-bar 3 and is bolted thereto, and its outer end terminates short of the handle 14. Within its body it is dropped as seen at 18′ in Fig. 2 to receive the bearing 23 of the main shaft. This shank is preferably connected with the yoke or the back bar of the same by means of a brace 4 as best seen in Fig. 1. As thus constructed the frame is exceedingly light and yet strong, and the use of angle-iron or T-iron prevents it from bending at the points where it would be undesirable. We propose to make the entire machine of a size and weight enabling it to be carried from point to point by two men, and whereas we prefer a pneumatic motor 20 it is obvious that we could use any other type of motor.

The saw blade 2 has a pair of longitudinal slots 5 in its body near its rear edge. Underlying each leg 1 of the yoke is a lip 6 best seen in Fig. 5, each lip having an upstanding rib 6′ of a size to fit loosely within one of said slots, and a bolt 6″ rising from the center of the rib to pass through the leg and receive a nut as best seen in Fig. 3. In the rear of the rib a pair of bolts 7 carry anti-friction rollers 7′ which rest against the rear edge of the saw blade as best seen in Fig. 3. Yet farther in the rear of these bolts and rollers the lip passes through a slot which is made in the head 16 of the T-bar 3 and underlies the lower leaf of the leg 1 while it overlies the web of said T-bar, the parts being connected by bolts 3′ as shown. The extreme end of the head 16 may be turned aside into a foot 16′ riveted to the upright web of this leg as also shown in Fig. 3. A similar construction is followed with respect to the other lip and outermost leg of the yoke, with the result that the saw blade 2 can reciprocate across the legs and above the lips 6 in a manner yet to be described. At its inner end the blade carries a bearing 2′ which we preferably make in the form of a clip detachably secured thereto by bolts or otherwise as shown, so that the blade may be reversed end to end when desired.

The driving mechanism comprises a shaft 21 journaled through said bearing 23 and connected at its outer end with a motor 20 shown only in Fig. 1, the shaft being held within the bearing by a collar 22 as best seen in Fig. 4, and the bearing carries an oil cup 15. Secured to the inner end of the shaft is a crank-wheel 13, to whose crank 11 a pitman or connecting bar 10 is attached. The other or inner end of this pitman embraces a wrist pin 8 as seen in Fig. 6, which pin passes through the bearing 2′ of the blade 2 with a collar 9 interposed between the bearing and pitman. The inner end of the wrist pin 8 is headed as shown at 8′ where it passes through the cross head 17, and next outside the head a nut 12 is applied to hold the pin within said head. The latter reciprocates on the guide 16 which is the head of the T-member 3 as above described.

With this construction it follows that when power is applied to the main shaft 21 from any suitable source, such as the motor 20, its rotation drives the crank wheel 13 and the latter through the pitman rod and crosshead reciprocates the saw blade 2 within the yoke. When now the frame is carried by the operators to a suitable point and the toothed edge of the blade is held against the work to be cut, it will be obvious that they need only to hold the frame horizontal if the work be upright, and press the saw blade gently toward the work. If the latter lies horizontal, as in the case of a fallen tree, the blade will be stood on edge and the operators need only to hold the frame in place, as the weight of parts will sink the saw into the kerf being cut. The operator at the left end of the device shown in Fig. 1 may use one hand to hold the handle 14 and the other to control the motor 20.

We would make the entire device of metal, and as at first stated our preference would be to make it of angle-iron as specified so that it would have sufficient strength and yet would not be too heavy to be portable.

What we claim is:

1. The herein described frame for portable saws consisting of a U-shaped yoke of L-iron, lips secured beneath the extremities of its legs and constituting guides for the saw blade; a shank including a T-bar the inner end of whose web is bolted to one of said legs while its outer end has a handle and its head constitutes a guide and has its inner end turned aside and bolted to said leg, and a second T-bar underlying the web of the first T-bar and secured thereto; and a brace connecting said shank and yoke.

2. In a portable sawing machine, a yoke having two legs, lips secured to the legs and constituting guides for the saw blade, a T-bar the inner end of whose web is bolted to one of said legs while its outer end has a handle and its head constitutes a guide, a cross head sliding on this guide, and a second T-bar underlying the web of the first T-bar and secured thereto, its body being dropped between its ends and its outer end terminating short of said handle; combined with a bearing mounted in the dropped portion of the T-bar, a crank shaft journaled therein, and a pitman connecting the crank thereof with said cross head, the latter being adapted for attachment to the saw blade.

3. In a portable reciprocating drag saw, the combination with a blade, a frame including a U-shaped yoke having a pair of legs whose extremities are adapted to overlie the saw blade, and a shank including a T-bar whose web underlies the inner leg and whose head has an opening; of two lips adapted to underlie the saw blade and each to underlie one of said legs, bolts connecting each lip and leg, anti-friction rollers on these bolts, the inner leg and lip extending through the opening in the head of said T-bar and over its web, and bolts passing through said web, the lip, and the leg.

4. In a portable reciprocating drag saw, the combination with the saw blade having slots near its rear edge, a yoke having a pair of legs whose extremities are adapted to overlie the blade, and a shank including a T-bar whose web underlies the inner leg and whose head has an opening for the blade above said leg; of two lips adapted to underlie the blade beneath said legs, bolts connecting each lip and leg, rollers on these bolts behind the blade, a rib rising from each lip and projecting through the slot in the blade, the inner end of one lip passing through said opening in the head of the T-bar and overlying its web, and bolts passing through said web, the lip, and the leg.

5. In a portable drag sawing machine, the combination with a shank including a T-bar whose head constitutes a guide and whose web stands horizontal, and a second T-bar whose head is secured beneath the web of the first T-bar, and a yoke carried by said shank and having guides for the saw blade; of a bearing adapted to be attached to one end of said blade, a cross head slidably mounted on said guide, a wrist pin mounted within said bearing and having a headed inner end mounted in said cross head, a nut on the wrist pin against the cross head, a collar on the wrist pin, and a connecting rod journaled on said pin between the nut and collar and leading to a source of power.

Signed at Jersey City in the county of Hudson and State of New Jersey this 24th day of March A. D. 1914.

GEO. E. MORRIS.
OSCAR F. OLIVER.

Witnesses:
JOSEPH GASSER,
DORA APPEL.